Figures 1, 3:
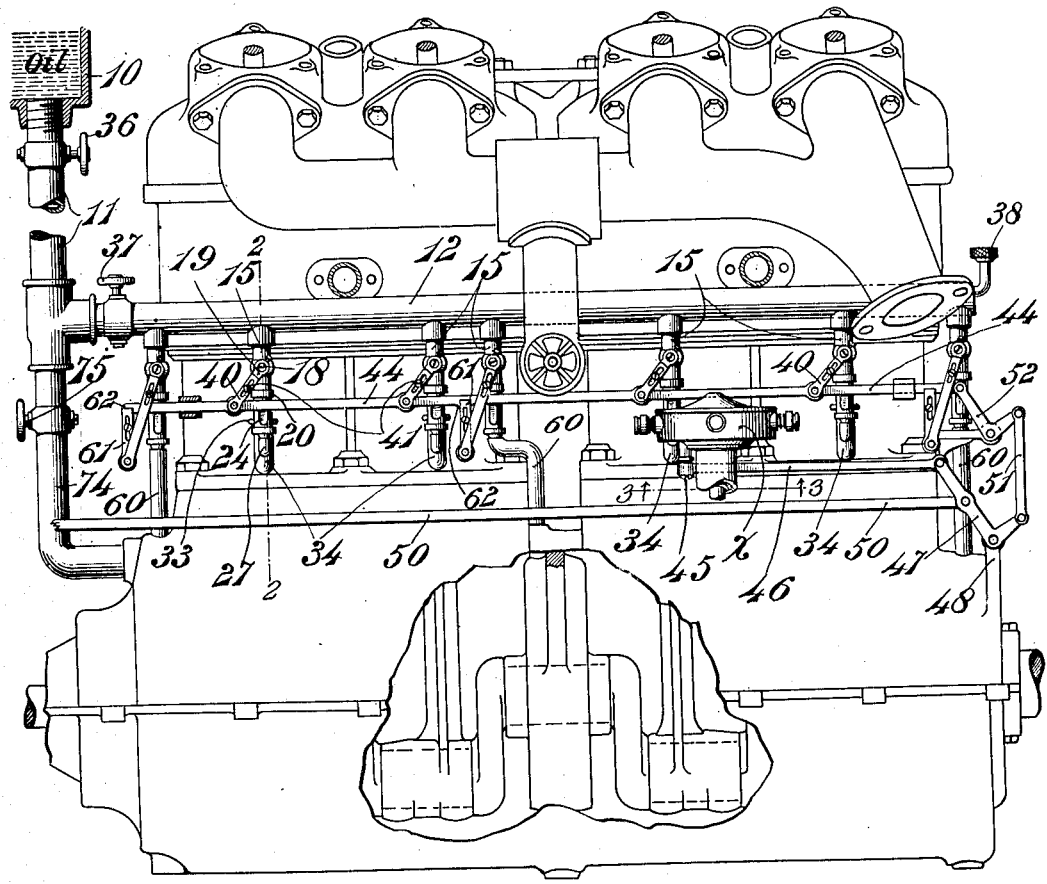

No. 856,659. PATENTED JUNE 11, 1907.
L. D. PICKETT.
LUBRICATOR.
APPLICATION FILED NOV. 3, 1906.

3 SHEETS—SHEET 1.

WITNESSES:

Lester D. Pickett, INVENTOR.

By

ATTORNEYS

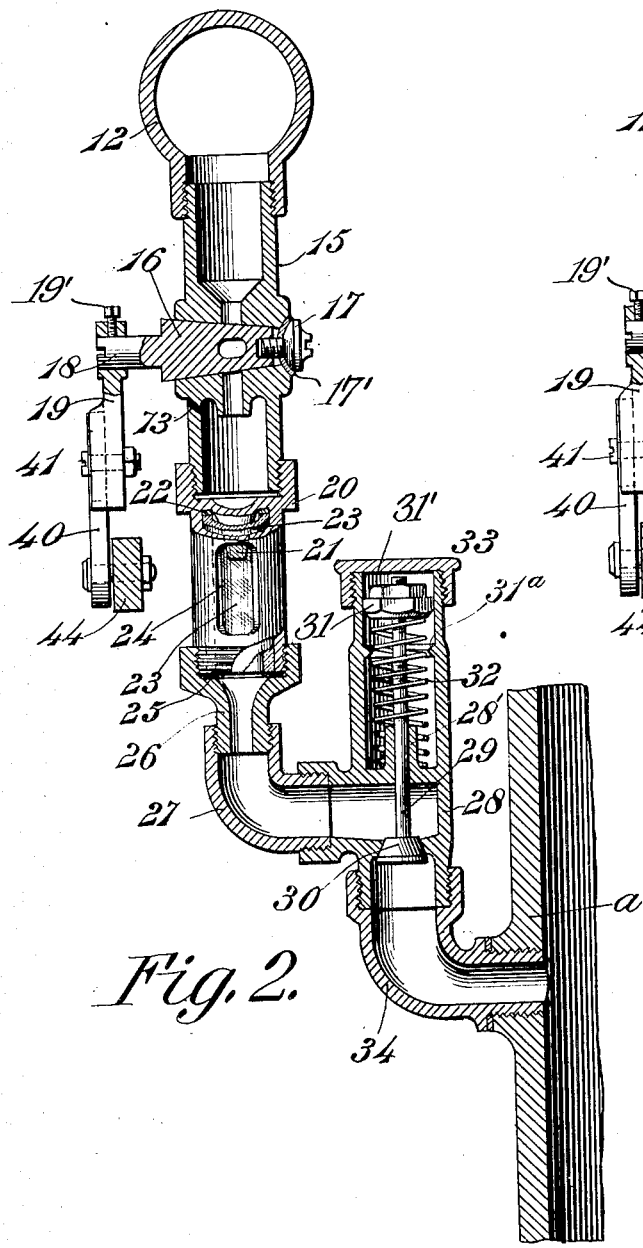

No. 856,659. PATENTED JUNE 11, 1907.
L. D. PICKETT.
LUBRICATOR.
APPLICATION FILED NOV. 3, 1906.
3 SHEETS—SHEET 3.
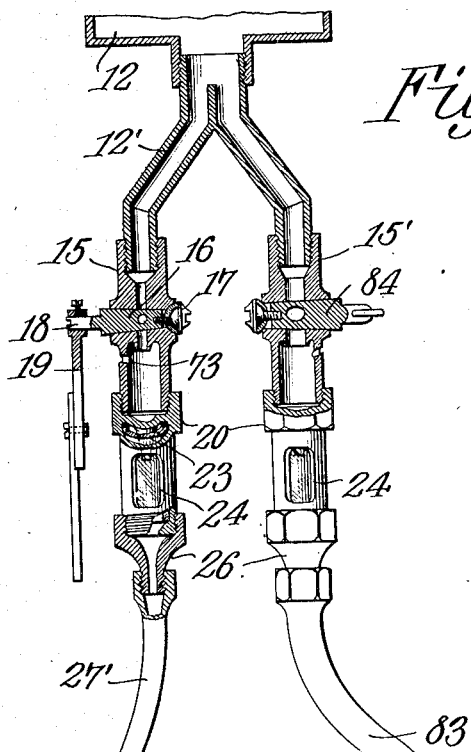
Fig. 6.
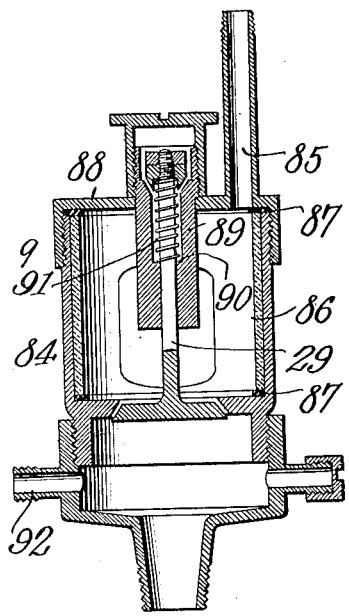
Fig. 7.
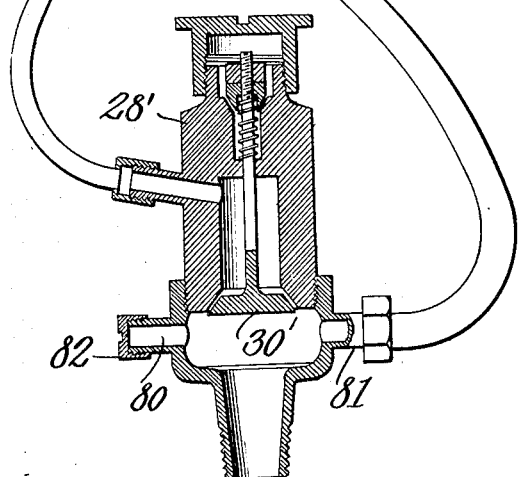
WITNESSES: Lester D. Pickett, INVENTOR.
By C. A. Snow & Co.
ATTORNEYS

UNITED STATES PATENT OFFICE.

LESTER DARIUS PICKETT, OF FREDONIA, NEW YORK.

LUBRICATOR.

No. 856,659.

Specification of Letters Patent.

Patented June 11, 1907.

Application filed November 3, 1906. Serial No. 341,907.

*To all whom it may concern:*

Be it known that I, LESTER DARIUS PICKETT, a citizen of the United States, residing at Fredonia, in the county of Chautauqua and State of New York, have invented a new and useful Lubricator, of which the following is a specification.

This invention relates to lubricators, and has for its principal object to provide an apparatus of simple construction for supplying to an internal combustion engine a quantity of lubricant that is proportioned to the speed of the engine.

A further object of the invention is to provide an improved form of lubricating apparatus which is automatically adjusted when mechanism which controls the speed of the engine is adjusted so that when the speed is changed by moving the spark timer or equivalent device, the quantity of lubricant fed will be altered to a corresponding extent.

A still further object of the invention is to provide a device for supplying lubricant to the bearings of the engine, the quantity supplied being controlled by the speed of the engine.

A still further object of the invention is to provide a lubricating apparatus in which the cylinders and bearings may all be supplied from a single source, and in which the quantities of lubricant fed will be automatically adjusted to correspond to the speed of the engine.

A still further object of the invention is to provide an improved connecting means between the spark timer and the mechanism which controls the quantity of lubricant fed, so that all of the lubricant feeding devices will be simultaneously adjusted to precisely the same extent.

With these and other objects in view, as will more fully hereinafter appear, the invention consists in certain novel features of construction and arrangement of parts, hereinafter fully described, illustrated in the accompanying drawings, and particularly pointed out in the appended claims.

In the accompanying drawings:—Figure 1 is an elevation of a portion of a four cylinder internal combustion engine provided with a lubricant feeding device constructed in accordance with the invention. Fig. 2 is a transverse sectional view on an enlarged scale on the line 2—2 of Fig. 1, showing one of the lubricant feeding devices. Fig. 3 is an inverted sectional plan view on the line 3—3 of Fig. 1, showing the connections between the spark timing apparatus and the lubricant valve adjusting rod. Fig. 4 is a fragmentary view illustrating a modified form of valve which may be used to control the flow of the lubricant. Fig. 5 is a transverse sectional view of one of the rocker arms on an enlarged scale. Fig. 6 is a sectional elevation illustrating a modification of the lubricator. Fig. 7 is a similar view illustrating a still further modification.

Similar numerals of reference are employed to indicate corresponding parts throughout the several figures of the drawings.

The invention has been shown in the present instance as applied to a four cylinder internal combustion engine of a type used in automobile work, this engine having four cylinders, four cranks, and three bearings, two of which are at the ends of the crank casing, and one between the second and third cranks.

At a suitable point adjacent the engine is placed an oil reservoir 10 which is connected by a vertical pipe 11 to a horizontally disposed pipe 12, the latter constituting the supply chamber of the several lubricating devices, and connected to this chamber are the lubricant feeding mechanisms, seven of these being shown in the present instance, four for the purpose of supplying lubricant to the cylinders, and the remaining three to supply lubricant to the bearings.

Each of the cylinder lubricating devices is of the construction shown in Fig. 2, and includes a valve casing 15, the upper end of which is screwed into a nipple depending from the pipe 12 or from a suitable T carried thereby. In the valve casing is arranged a tapered plug valve or cock 16, held in place by a screw 17 and washer 17' and provided with a stem 18 on which is an arm 19 adjustably secured by a screw 19', and by rocking this arm in one direction or the other, the effective area of the valved port or passage may be controlled, so that a given quantity of lubricant will pass from the upper supply reservoir 12 to the lower portion of the valve casing. This arm 19 is connected to the speed regulating device of the engine in the manner hereinafter described, and when the speed regulating device is moved to secure faster running, the port or passage of the valve is opened more widely, but when the speed is reduced, the area of the valve port or passage is correspondingly reduced, so that the quantity of oil allowed to pass will be strictly in accordance with the engine speed.

Coupled to the lower portion of the valve casing is a vertical tube 20, in the upper portion of which is arranged a small nipple or nozzle 21, through which the lubricant flows, and surrounding this nipple is a packing ring 22 against which is seated the upper end of a glass tube 23, the latter being disposed within the tube 20, and said tube 20 has an opening or openings 24 to expose the glass, so that the passage of the lubricant may be observed from time to time. The lower end of the glass tube is seated on a packing ring 25 that is carried by a reducing coupling 26 which connects the lower end of the tube 20 to an elbow 27.

Connected to the elbow 27 is a valve casing 28 having a tubular flange 28' through which passes a stem 29 of a valve 30. The upper end of the stem is threaded for the reception of two nuts 31— and 31', of which the lower face of the nut 31 is slightly tapered and is arranged to engage against a tapered seat 31ª formed by slightly counter-boring the upper portion of the valve casing. Between the lower nut 31 and a fixed portion of the casing is arranged a spring 32, the stress of which may be adjusted by turning the nuts. It will be seen that the seat or stop 31ª serves to limit the downward movement of the nut 31, and thus prevent opening movement of the valve beyond a predetermined extent. The top of the casing is closed by a dust cap 33 which may be removed when it becomes necessary to inspect or adjust the parts.

The lower portion of the valve casing is connected by an elbow 34 to the wall of the cylinder a.

In the operation of the mechanism as thus far described, the pipe 12 is filled with oil from the reservoir 10 by opening the controlling valves 36—37, and opening an air vent 38, so that the oil may freely flow into the pipe The valve of the air vent is then closed. The oil feeds from the pipe 12 through the valves ports or passages of the several lubricant feeders, and flows down through the nozzle 21 passing thence to a position on top of the valve 29. When the piston of the engine makes an out stroke and a slight vacuum is created within the cylinder, the valve 29 will be opened and the lubricant which has been fed to the valve chamber 28 will be sucked into the cylinder. The cylinder will take in all of the lubricant which has been fed to the chamber 28, and the quantity fed is regulated by the position of the valve 16.

Each of the arms 19 is grooved for the reception of the upper end of a second arm 40, the latter being slotted for the passage of a locking screw 41 by which the two arms are secured together, the connection being such as to permit of adjustment of the length of the arms. The lower ends of all of the arms 40 are connected to a rod 44 and said rod is connected in suitable manner to the mechanism which regulates the speed of the engine. In the present instance there has been shown a spark timer x, and said spark timer has a pendent pin 45 from which extends a rod 46 that is connected to a bell crank lever 47 fulcrumed on a bracket or lug 48. From one arm of the bell crank lever extends a rod 50 which is connected in any suitable manner to a lever or other device within reach of the chauffeur or other person controlling the engine. The opposite arm of the bell crank lever 47 is connected by a link 51 to a second bell crank 52, and this bell crank lever 52 is connected to the rod 44, so that each time the spark timer is moved for the purpose of adjusting the speed of the engine, the rod 44 will be correspondingly moved and all of the valves will be adjusted for the purpose of increasing or decreasing the quantity of lubricant passing from the pipe 12.

The four lubricant feeding devices which are connected to the cylinders are, of course, provided with the valves 29, but inasmuch as there is no suction at the bearings, the valves 29 are entirely unnecessary, and the lower ends of the sight feed tubes of the remaining lubricant feeders are connected to the bearings by small tubes 60, there being a tube leading to each of the end bearings, and the third tube leading to the center bearings, or where a greater or less number of bearings is used, the number of lubricant feeding devices will be correspondingly altered.

It is found in practice that the bearings do not require the same quantity of lubricant as the cylinder, and in order to reduce the quantity fed in the most simple manner, the connecting arms of the valves which control the bearing supply are somewhat longer than the arms 19—40, and these longer arms are connected to brackets 61 which are adjustably secured to the small arms 62 depending from the arm 44, the point of connecting being thus placed at some distance from the rod 44, the valves which control the supply of lubricant to the bearings will receive less movement than those which control the feed to the cylinders.

In Fig. 4 is illustrated a slight modification of the construction of the controlling valve, the valve 16' being here arranged to move against the seat 70, and being carried by a threaded stem 71 which is connected to the operating arm.

It will be observed that in all cases the valve chambers are provided with small air inlet ports 73, so that a sufficient quantity of air may enter below the valves to permit the withdrawal of the lubricant during the suction stroke.

After the engine has been cleaned by the use of kerosene or the like, it becomes necessary to flood the crank casing with lubricating oil, and for this purpose an auxiliary pipe 74 is tapped into the pipe 11 and carries a suitable valve 75, so that by opening the valve the oil may be allowed to flow directly from the main reservoir or supply tank to the crank casing.

In the construction shown in Fig. 6, the reservoir 12 is connected by a branched coupling 12' to two valve casings 15—15', of which the casing 15 is similar to that shown in Fig. 2 and contains a cock under the control of the spark timer or other speed regulating mechanism. The lubricating material passing through the casing 15 is conducted by a pipe 27' to a valve chamber 28' in which is arranged a valve 30' corresponding in its structure, mounting and operation to the valve shown in Fig. 2. The lower end of this valve casing is in the form of a threaded nipple adapted to be screwed into a threaded opening in the cylinder or crank casing to be lubricated. From opposite sides of the casing extend nipples 80 and 81, one of which is normally closed by a cap 82, and this cap may be removed for cleaning purposes. The opposite nipple is connected by a pipe 83 to the discharge end of the valve casing 15', and its sight glass, and in this valve casing 15' is a manually operable cock 84 which may be turned to open position in order to flood the cylinder and the crank casing when necessary. The nipples 80 and 81 are preferably of the same size, so that the pipe 83 may be coupled to either of them.

In the construction shown in Fig. 7 the valve casing 84 is provided with a nipple 85 which may be connected to a tube similar to the tube 27' of Fig. 6. Arranged within the casing is a glass tube 86, the upper and lower ends of which are seated against packing rings 87, the uppermost packing ring being clamped down by a cap 88 that is screwed on the upper portion of the casing proper. The central portion of the cap 88 carries a tubular stem 89 that is counter-bored to form a shoulder 90 on which is seated the lower end of a compression spring 91. The valve stem 29 extends up through the tubular stem, and through the spring, and on the upper end of the stem are the riveting nut and lock nut previously described. The casing is further provided with a nipple 92 for connection to a tube similar to the tube 83 shown in Fig. 2.

The construction illustrated in Figs. 6 and 7 may be employed to advantage for lubricating single cylinder vertical engines or single and double cylinder horizontal engines.

I claim:—

1. An engine lubricating means comprising an elongated supply chamber, a plurality of discharge chambers arranged below the same and connected to the parts to be lubricated, an independent valve arranged above each of the discharge chambers and controlling the flow of lubricant thereinto, a valve adjusting means operatively connected to all of said valves, and separate valves controlling the outflow from said discharge chambers.

2. An engine lubricator comprising separate lubricant chambers for each part to be lubricated, a supply tube extending above all of said chambers, a separate valve for controlling the flow of lubricant into each of the chambers, a valve stem in each valve, adjustable arms connected to the valve stems, and an operating rod connected to the arms.

3. In an engine lubricator, a separate lubricating device for each part to be lubricated, valves for controlling the entrance of lubricant to said devices, a common operating means for the valve, and independently adjustable connections between the operating means and the valves to permit the feeding of a larger quantity from one device than is fed from the other.

4. An engine lubricator comprising a plurality of lubricating devices having a common source of supply, a separate valve controlling the quantity of lubricant passing from the source of supply of each feeding device, a valve operating means, and independent connections between the operating means and the valves to permit variation in the quantity of lubricant fed by the several feeding devices.

5. In an engine lubricator, a separate feed chamber for each cylinder and each bearing, a supply pipe common to all of said chambers, a valved connection between the supply chamber and each of the feeding chambers, a valve operating means, and connecting arms extending between the operating means and the valves, the arms of those valves which control the flow to the bearings being longer than those which control the supply to the cylinders.

6. The combination in a lubricator, of a separate feed chamber for each part to be lubricated, a main supply tank, a supply pipe leading therefrom and extending above all of the chambers, a valved connection between the supply tank and each chamber, an operating means common to all of the valves, and a valved pipe leading from the supply pipe to the crank casing to permit flooding of the latter with lubricant.

7. In an engine lubricator, a supply pipe, a valve casing connected thereto, a valve arranged within the casing, an operating means for the valve, a tube connected to the valve casing and provided with display openings, a sight feed glass arranged within the tube, said tube carrying a nipple to direct the oil centrally through the tube, a valve casing connected to the lower portion of the tube, a suction opened valve therein, a spring tending to maintain the valve in closed position, and means for adjusting the stress of the spring.

8. In an engine lubricator, a suction opened valve, a stem carrying the same, a closing spring surrounding the stem, a valve casing having a tubular guide extending within the spring, one end of the stem having screw threads, a pair of nuts mounted on the threaded portion of the stem and adjustable to regulate the stress of the spring, the valve casing being provided with a seat or stop against which the innermost nut engages to limit the opening movement of the valve.

In testimony that I claim the foregoing as my own, I have hereto affixed my signature in the presence of two witnesses.

LESTER DARIUS PICKETT.

Witnesses:
 LOUIS L. THRASHER,
 D. G. PICKETT.